April 6, 1937. R. R. HAWK 2,076,369
BRAKE BEAM SAFETY STRAP
Filed April 1, 1933
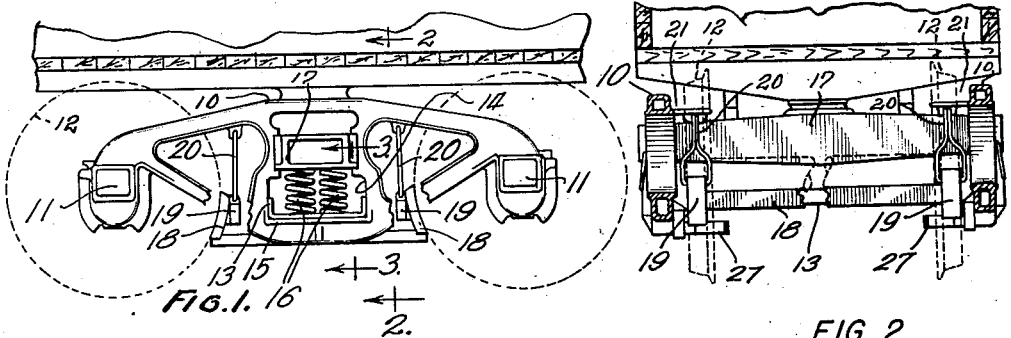
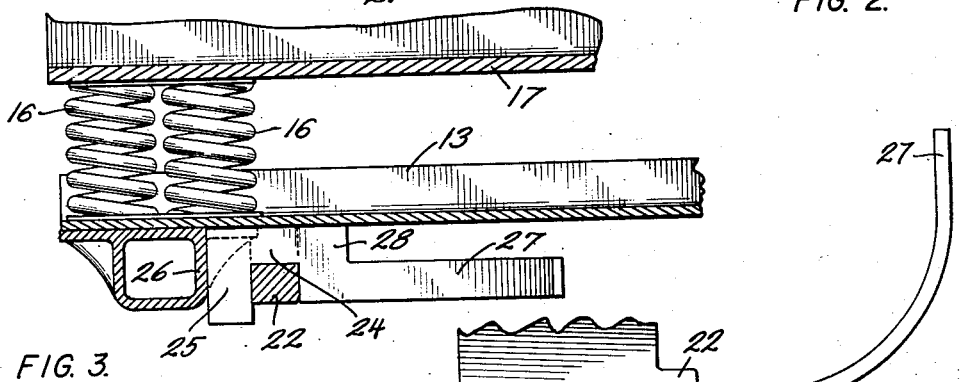
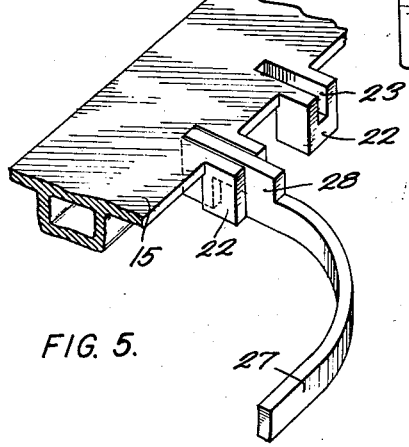
INVENTOR:
RUBY R. HAWK
BY Cox + Moore
ATTY'S.

Patented Apr. 6, 1937

2,076,369

UNITED STATES PATENT OFFICE 2,076,369

BRAKE BEAM SAFETY STRAP

Ruby R. Hawk, Chicago, Ill., assignor to Chicago Railway Equipment Company, Chicago, Ill., a corporation of Illinois Application April 1, 1933, Serial No. 663,957

32 Claims. (Cl. 188—210)

The present invention relates to guard, guide, or support devices for brake beams in railway trucks.

One object of the invention is to utilize the weight of a car body supported by the truck in securing the guard, guide, or support device in position.

Another object is to provide a firm, detachable connection between the guard, guide, or support device and the supporting truck part.

Another object is to provide a solid connection between the guard, guide, or support device and the truck which will prevent vibration and rattling of the device.

Another object of the invention is to provide a guard, guide, or support device which can be removed so as to permit removal of the brake beams without the necessity of taking off the wheels carried by the truck. This enables the truck to remain on the tracks and be supported while the brake beam is removed or replaced as the case may be.

Another object of this invention is to provide a new article of manufacture in the form of a brake beam guard, guide, or support strap which can be detachably mounted on a side frame of a truck.

Another object of this invention is to support a guard, guide, or support device on a truck in such a way that the number of separate parts necessary to mount the device and firmly hold the same in position is decreased while at the same time the efficiency of the strap mounting is increased as will more clearly appear hereinafter.

Other objects of this invention will appear hereinafter as the description thereof proceeds, the novel features, arrangements, and combinations being hereafter clearly set forth in the specification and appended claims.

In the drawing:

Fig. 1 is a side elevation of a truck embodying a form of the invention, parts of the side framing being broken away;

Fig. 2 is a section taken along the line 2—2 of Fig. 1;

Fig. 3 is a section taken along the line 3—3 of Fig. 1;

Fig. 4 is a plan view of a portion of the side frame showing two safety straps connected thereto extending in opposite directions beneath different brake beams; and Fig. 5 is a perspective view of the portion of the mechanism shown in Fig. 4 with one of the safety straps removed.

A very high percentage of railway accidents is caused by brake beams falling onto the rails and to prevent this it has been customary to provide safety devices or guards supported in such a position on the truck as to lie beneath the brake beams whereby if the support for the brake beam breaks, the brake beam will not fall on the rail but will fall on the safety guard. These safety devices usually are connected to the spring plank connecting the opposite side frames of a truck and have been secured thereto either by riveting or welding or the like. There are a number of disadvantages in this arrangement. In the first place, if the safety devices are permanently secured to the spring plank, difficulty is experienced in removing the brake beam if it is necessary to do so for the purpose of repair, as the brake beam is confined in a space between the spring plank and the adjacent wheels. If a brake beam of the truss type cannot be dropped down to its lowest position above the rails, it cannot readily be removed, in view of the fact that the truck side frames usually do not have openings of a sufficient size to permit removal of this type of brake beam therethrough. The safety devices, therefore, should be removable without dismantling the truck. If the safety devices are not permanently secured to spring plank, the connections become worn resulting in rattling and eventually the safety device may become disconnected from the support. Attempt has been made to place the connections between the spring plank and the safety devices under a tension so as to prevent rattling, etc., but this has frequently resulted in the connections loosening up quicker than they otherwise would.

In carrying out my invention, I provide a safety device which is not only rigidly secured in place when in operative position but which is releasable so as to permit removal of the brake beam if desired.

The truck comprises the usual side frames 10, with journal boxes 11, and axles mounting the wheels 12. A channel section spring plank 13 extends between the side frames and rests on the lower portions thereof at the bottoms of openings 14. Flanges 15 project laterally from the side frame lower members with their upper surfaces in alinement with the upper surfaces of these members. Supported on the opposite ends of the spring plank 13 are the usual springs 16 which may be of any desired construction and on these springs there rests a bolster 17 constituting the load carrying member of the truck and provided with the usual center bearing for pivotally mounting the vehicle body. The elements which have so far been described are part of the standard or usual construction for railway trucks. The truck is also provided with brake beams 18, shown diagrammatically, which carry the brake shoes 19 at the opposite ends thereof, the brake shoes being opposed to the surfaces of the wheels 12. The brakes are applied in the usual manner by a connection substantially centrally of the brake beam but not illustrated since the construction is well known in the art. The brake beams are suspended by links 20 which are pivoted to horizontally extending lugs 21 on the side frames 10 and to the brake beam. This again is one of the usual constructions for supporting the brake beam. If these links break or if the lugs 21 should break or if for any other reason, the brake beam is permitted to fall downwardly, it will fall onto the rails and this is apt to cause a wreck. To prevent the brake beam from falling onto the rails in case it is disconnected from its support, it is usual to provide safety guard devices which extend beneath the brake beams in position to catch the brake beams if and when they fall. The safety devices herein illustrated are in the form of straps connected to the side frames instead of to the spring plank, in a manner which I shall now describe. New frames which are provided will be formed slightly differently than under present conditions to accommodate the safety straps, and existing frames can have additional supports formed thereon for the purposes hereinafter specified.

Each side frame as already pointed out, has the flanges 15 and in carrying out my invention, I preferably extend the flange 15 on the inside of the frame to form the U-shaped supports 22 having recesses 23 which extend into the main portion of the flange 15 as is clearly illustrated in Figs. 3, 4, and 5. A portion of the recess which is in the flange 15 is open at the bottom thereof for a purpose which will appear presently. The safety strap or guard has a horizontally extending portion 24 adapted to be received within that portion of the recess 23 which is in the U-shaped support 22 and a downwardly extending portion 25 which extends into that portion of the recess 23 which is in the flange 15. The downwardly extending portion 25 on the safety strap is adapted to be snugly received between the portion 26 of the frame and the U-shaped support 22 as clearly illustrated in Fig. 3. This prevents horizontal movement of the safety strap in the direction of its length. The free end 27 is curved in a horizontal direction and is off-set at 28 in a downward direction so that the free end 27 thereof will extend under the brake beam. The safety strap thus forms a brake beam guard or strap for preventing accidental falling of the brake beam onto the rails. The off-set portion 28 also abuts against the U-shaped portion 22 and gives an additional bracing to the free end 27 of the safety strap. The portion 24 is slightly deeper than the corresponding portion of recess 23 so that the upper edge of the portion 24 projects slightly above the level of flanges 15 and the edges of the recess 23. In practice, the amount which this portion projects above the edges of the recess is about $\frac{1}{32}$ of an inch. The spring plank 13 which rests on the flanges 15 will also rest on the upper side of the portion 24 of the safety strap and will hold it firmly within the recess 23 against vertical movement due to the pressure of springs 16 which is exceedingly great due to the fact that the springs support the bolster 17 which in turn supports the car body. The downwardly extending portions 25 and 28 of the safety strap prevent horizontal movement thereof in the direction of its length and the safety strap has a snug fit with the side walls of the recess 23 whereby the safety strap is firmly held in operative position at all times while at the same time being removable for replacement or repair or to remove the brake beam 18. When the strap is removed, the brake beam can be withdrawn from below the frame of the truck. The usual practice in removing the safety strap 27 would be to jack up the bolster 17 at one end or at both ends and remove the springs 16, whereafter the spring plank 13 can be lifted and the safety straps removed.

One advantage of my invention is that a safety strap may be provided for both ends of the brake beam.

The removal of one safety strap will permit the corresponding end of the brake beam to be dropped down and the brake beam can then be slid downwardly from beneath the truck frame.

Obviously those skilled in the art to which this invention pertains may make various changes in the particular construction and arrangement of parts shown in the accompanying drawing without departing from the spirit of this invention or the scope of the appended claims and therefore I do not wish to be limited except as hereinafter set forth in the appended claims.

Having thus fully described my invention, what I claim as new and desire to obtain by Letters Patent is:

1. In structure of the class described having a brake-beam associated therewith, the combination with a truck frame having side members with recesses therein, of straps each having one end supported in a recess in a side member and the other end extending into a position beneath the brake-beam, and means for holding said first mentioned ends of said straps in said recesses against displacement therefrom.

2. In structure of the class described having a brake-beam associated therewith, the combination with a truck frame having side members with recesses therein, of straps each having one end in a recess in a side member and the other end extending into a position beneath the brake-beam, and clamping means for holding said first mentioned ends of said straps in said recesses against displacement therefrom, said means comprising a removable spring support extending over said recesses and over and in engagement with said first mentioned ends, springs on said support, and a load supporting member carried by said springs whereby the weight of the load on said beam compresses said springs and holds said first mentioned ends firmly but releasably within said recesses.

3. In structure of the class described having a brake-beam associated therewith, the combination with a truck frame having side members with recesses therein, straps each having one end in a recess in a side member and the other end extending into a position beneath the brake-beam, and clamping means for holding said first mentioned ends of said straps in said recesses against displacement therefrom, said means comprising a removable spring support extending over said recesses and said first mentioned ends, springs on said support, and a load supporting member carried by said springs whereby the weight of the load on said member compresses said springs and holds said first mentioned ends firmly but releasably within said recesses.

4. In structure of the class described, the combination with a truck having side frames forming wheel supports, inwardly projecting flanges having recesses therein, safety straps each having an end adapted to fit within a recess in one of said side frames, a spring support extending from one side frame to the other and having portions overlying the ends of said straps within said recesses to hold said ends within said recesses, springs supported by said spring support, and a load supporting member supported by said springs, the free ends of said straps extending beneath the position occupied by a brake-beam which supports the brakes for wheels carried by said side frames.

5. In structure of the class described, the combination with a car and a car truck including a side frame having a part with a downwardly extending recess therein, of a brake beam guard, guide, or support device having one end portion thereof formed with a downwardly extending projection arranged within said recess, said strap terminating a short distance inwardly from said side frame, a removable member extending over said end portion of said device for holding said downward projection in said recess against displacement thereof, the free portion of said device extending into a position to engage and support the usual brake-beam associated with the truck if and when the brake-beam drops, and means for transmitting an appreciable portion of the weight of the car to said removable member for normally retaining said member in holding position.

6. As a new article of manufacture, a safety strap having a downwardly extending projection at one end thereof and being curved intermediate its ends in a plane at substantially right angles to said projection so that the opposite ends thereof extend in directions at substantial angles with respect to each other.

7. A device of the class described comprising a truck frame having a recess therein with a portion of the recess deeper than other portions of said recess, a safety strap having a projection extending into the deeper portion of said recess, and a member overlying said recess engaging said strap to hold said strap in said recess, and releasable pressure exerting means for holding said last mentioned member in said position.

8. In structure of the class described, a spring plank and side frame, a brake beam, guard, guide, or support device having a portion located between said spring plank and side frame, and pressure means for urging said side frame and spring plank toward each other to grip the said device therebetween.

9. As a new article of manufacture, a safety strap having the ends thereof extending at substantial angles with respect to each other in substantially the same plane, and a projection at one end thereof extending in a direction substantially perpendicular to said plane.

10. As a new article of manufacture, a safety strap having a projection at one end thereof adapted to interlock within a recess formed between opposed portions of a side frame and spring beam of a truck, with said strap having the opposite ends thereof extending at substantial angles with respect to each other in substantially the same plane.

11. In a railway truck, the combination with a side frame, of a spring plank supported by said side frame, said plank and said frame having opposed surfaces shaped to produce a hollow recess therebetween for the reception of one end of a safety strap, a safety strap having one end thereof arranged within said recess to snugly fit within said recess and be held against shifting movement with respect to said plank and side frame when said beam and side frame are in operative position with respect to each other to prevent removal of said safety strap and to insure the firm mounting thereof.

12. A brake beam guard, guide, or support device for car trucks including a part carried by the side frame and underlying the spring plank and maintained against displacement by the weight of the car body carried on the side frames.

13. A brake beam guard, guide, or support device for car trucks including a metal member carried by the side frame and with a part underlying and closely contacting with the spring plank, said part being maintained against displacement by the weight of the car body carried on the side frames.

14. A brake beam strap for car trucks including a member provided with a bend intermediate its ends carried by the side frame and underlying the spring plank and maintained against displacement by the weight of the car body carried on the side frames.

15. In a device of the class described, the combination with a side frame, a spring plank, a safety strap having a portion arranged between the opposed surfaces of said spring plank and side frame, means for positively locking said strap against any substantial movement parallel to the opposed surfaces on said plank and side frame, and means for urging the opposed surfaces of said plank and side frame toward each other to prevent substantial movement of said safety strap in a direction perpendicular to said surfaces.

16. In a device of the class described, the combination with a spring plank element and side frame element, said elements having opposed surfaces, pressure means for urging the opposed surfaces of said elements toward each other, one of said elements having a recess therein for the reception of a portion of a safety strap, a safety strap having a portion thereof arranged within said recess and a contiguous portion extending out from between said plank and side frame to a position beneath the brake beam position, the shape of said recess and portion of said strap arranged therein being such as to prevent removal of said safety strap while said spring plank and side frame are in operative position with respect to each other.

17. In a device of the class described having a brake beam associated therewith, the combination with a truck frame having a side member with a recess therein, a strap having one portion thereof arranged in said recess and another portion thereof extending into a position beneath said brake beam, and a clamping means for holding said first mentioned portion of said strap in said recess against displacement therefrom.

18. In a railway truck, a load supporting member and a frame part with a recess, a brake beam guard, guide, or support device having a portion extending into said recess, and means applying the weight of said load supporting member to said portion, said part and means comprising the sole mounting for said device.

19. In a railway truck, a brake beam, a side frame, spring supporting structure carried thereby, a recess in said structure, and a brake beam guard, guide, or support device having a portion extending into said recess and releasably held in position therein by said structure, said frame and structure comprising the sole carrying and retaining means for said device.

20. In a railway truck, a brake beam, a side frame having an opening, and being formed with a horizontally extending flange at the lower edge of said opening, a recess in said flange of less depth at the free edge of said flange than at a position more remote from said free edge, a brake beam guard, guide, or support device having a portion extending into said recess and substantially conforming to the general shape thereof, and spring supporting structure in said frame opening and engaging said device to maintain said portion in said recess.

21. In a railway truck, a brake beam, a side frame having a laterally extending element for supporting a spring, said element having a recess in an edge thereof with laterally and downwardly extending portions, and a brake beam guard, guide, or support device having laterally and downwardly extending portions secured in the similarly disposed portions of said recess.

22. In a railway truck, a side frame having a spring supporting portion including a laterally extending flange with a recess, there being an element closing the bottom of a portion of said recess and another portion of said recess being open at the bottom, a brake beam guard, guide, or support device having a portion supported on said element and projecting slightly above the edge of said recess, said device also having a downward projection extending within the open portion of said recess and below the level of the upper surface of said element, and spring structure overlying said flange and the portion of said device supported on said element.

23. In a railway truck, frame structure part having a recess with a portion of increased depth spaced inwardly from the end of the recess, a brake beam guard, guide, or support device having an element extending into the deeper portion of said recess, a member in a position overlying said recess and engaging said device to hold the same in said recess, and releasable pressure-exerting means for holding said element in said position, said part, member and means comprising the sole mounting for said device.

24. In a railway truck, a side frame part, a brake beam, bolster spring seat structure having a surface opposed to a surface on said side frame part and movable relative thereto, a guard, guide, or support device having a portion extending beneath said brake beam and a portion disposed between said opposed surfaces, and pressure means urging said surfaces towards each other to grip the portion of said device located therebetween, said device including means detachably interlocking with said side frame part to prevent withdrawal of said device from between said surfaces.

25. In a railway truck, a side frame, spring seat structure on said side frame, said seat structure and said frame having a recess between opposed vertical surfaces facing towards and away from the truck center line, and a brake beam guard, guide, or support device carried solely by said side frame and having one end portion thereof engaging said surface and securely held in said recess when said spring seat structure and side frame are operatively assembled.

26. In a railway truck, a side frame part, spring seat structure thereon, a brake beam guard, guide, or support device having a portion located between opposed surfaces of said structure and said part to form the sole mounting of the device, means for positively locking said portion against any substantial movement parallel to said opposed surfaces, and means for urging said surfaces towards each other to prevent substantial movement of said portion in a direction perpendicular to said surfaces.

27. In a railway truck, a spring seat element and a side frame element having opposed surfaces, pressure means urging said surfaces towards each other, one of said elements having a recess, and a brake beam guard, guide, or support device having a portion seated within said recess, to form the sole mounting of the device, and having a contiguous portion for underlying a brake beam, said recess and the portion of said device located therein being shaped to prevent removal of said device while said elements are operatively assembled.

28. In a railway truck, a brake beam, a frame side member with a recess, a guard, guide, or support device having a portion disposed in said recess and another portion extending beneath said brake beam, and means for holding said first mentioned portion in said recess, said recess and means comprising the sole support for said device.

29. In a railway vehicle truck, a frame member, means for supporting a vehicle body from said member, and a brake beam guard, guide, or support device clamped between said frame member and said means and carried thereby and terminating in an otherwise unsupported end a short distance inwardly from said member.

30. Structure as specified in claim 29 in which said means includes a bolster spring seat element engaging said guard, guide, or support device to firmly clamp the same against said frame member.

31. Structure as specified in claim 29 in which said means includes a spring plank carried by said member and bearing against said guard, guide, or support device.

32. In a railway vehicle truck, spaced side frames, springs carried thereby, a bolster extending between said side frames and resting on said springs for supporting a vehicle body, and independent brake beam guard, guide, or support devices clamped between said bolster supporting springs and said frames, each device terminating a short distance inwardly of its respective side frame and at a substantial distance from the opposite side frame and device.

RUBY R. HAWK.